United States Patent
Desai et al.

(10) Patent No.: US 12,450,127 B2
(45) Date of Patent: Oct. 21, 2025

(54) BARE-METAL SNAPSHOTS

(71) Applicant: NVIDIA Corporation, Santa Clara, CA (US)

(72) Inventors: Soham Jayesh Desai, Jacksonville, FL (US); Rami Ailabouni, Melbourne (AU); Newton Paine Liu, Santa Clara, CA (US); Binu Ramakrishnan, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 73 days.

(21) Appl. No.: 18/497,228

(22) Filed: Oct. 30, 2023

(65) Prior Publication Data

US 2025/0138958 A1    May 1, 2025

(51) Int. Cl.
*G06F 11/14* (2006.01)
*G06F 21/60* (2013.01)

(52) U.S. Cl.
CPC ........ *G06F 11/1464* (2013.01); *G06F 21/602* (2013.01); *G06F 2201/84* (2013.01)

(58) Field of Classification Search
CPC . G06F 11/1464; G06F 21/602; G06F 2201/84
See application file for complete search history.

(56) References Cited

U.S. PATENT DOCUMENTS

| | | | | |
|---|---|---|---|---|
| 7,624,240 B1* | 11/2009 | Colbert | ............... | G06F 9/45558 |
| | | | | 711/159 |
| 8,352,608 B1* | 1/2013 | Keagy | ................ | G06F 9/45558 |
| | | | | 709/225 |
| 8,538,919 B1* | 9/2013 | Nielsen | ............... | H04L 63/0272 |
| | | | | 718/1 |
| 8,600,943 B1* | 12/2013 | Fitzgerald | ............. | G06F 16/119 |
| | | | | 707/648 |
| 9,755,900 B2* | 9/2017 | Tenginakai | ......... | H04L 41/0889 |
| 11,593,223 B1* | 2/2023 | Mehta | ................ | G06F 11/1448 |
| 2020/0050779 A1* | 2/2020 | Prokop | ............... | H04L 63/0428 |
| 2023/0229316 A1* | 7/2023 | Flag | ........................ | G06F 3/0634 |
| 2023/0376586 A1* | 11/2023 | Shemesh | ............. | G06F 9/45558 |
| 2024/0135027 A1* | 4/2024 | Herzberg | ............ | G06F 21/6245 |
| 2024/0241779 A1* | 7/2024 | McNeill | .............. | G06F 11/0772 |

* cited by examiner

*Primary Examiner* — Merilyn P Nguyen
(74) *Attorney, Agent, or Firm* — Lowenstein Sandler LLP

(57) ABSTRACT

An integrated circuit includes a host interface coupled to a host device executing a tenant operating system (OS) on bare metal and hardware accelerator(s) coupled to the host interface and a network interface. The hardware accelerator(s) receive, over the host interface, a snapshot request relating to a snapshot of tenant OS. Snapshot request includes a location, in a physical memory of the host device, of a swap file having contents of random access memory of the host device. The hardware accelerator(s) encrypt the swap file and initiate transfer of the encrypted swap file to a network storage device coupled to a cloud-based server. The hardware accelerator(s) send, over the network interface, to a snapshot manager hosted by the cloud-based server, metadata associated with storing the encrypted swap file in the cloud-based server, to allow the snapshot manager to manage the snapshot of the tenant OS.

21 Claims, 8 Drawing Sheets

300

Receive a snapshot request relating to a snapshot of a tenant operating system (OS) executing on bare metal of a host device coupled to the DPU, the snapshot request including a location, in a physical memory of the host device, of a swap file including contents of random access memory of the physical memory.
310

↓

Encrypt the swap file.
320

↓

Transfer the encrypted swap file to a network storage device coupled to the DPU and a cloud-based server.
330

↓

Send, to a snapshot manager hosted by the cloud-based server, metadata associated with storing the swap file in the cloud-based server, to allow the snapshot manager to manage the snapshot of the tenant OS.
340

Authenticate, based on a DPU identifier received from the DPU, a snapshot client executing on the DPU during initiation of the host device.
410

Store, in the snapshot data store, registration data indicating that the DPU is assigned to support the host device.
420

Upon receiving, from the DPU, a request relating to a snapshot of the tenant OS executing on the host device, determine to handle the request in view of the registration data in the snapshot data store.
430

FIG. 4

BARE-METAL SNAPSHOTS

TECHNICAL FIELD

At least one embodiment generally pertains to snapshotting as a form of backup, and more specifically, but not exclusively, to bare-metal snapshots using data processing units and remote storage.

BACKGROUND

In certain cloud-based infrastructures, hypervisors run on client machines that interact with an infrastructure control plane to perform snapshot creation and snapshot management. A snapshot is an image or data file that represents the state of a virtual machine running on the hypervisor, e.g., at hibernation, and thus is a form of system or machine backup. For example, hibernation may be entered and exited via the "suspend-and-resume" operation available through virtual machines running on VMWare® workstations or the like. Snapshot management also includes facilitating duplication or migration of the virtual machines operating across different host devices.

BRIEF DESCRIPTION OF DRAWINGS

Various embodiments in accordance with the present disclosure will be described with reference to the drawings, in which:

FIG. 3 is a flow chart of an example method for a DPU's facilitation of snapshotting an operating system (OS) tenant running on a bare-metal host device according to some embodiments;

FIG. 4 is a flow chart of an example method for a cloud-based server to interact with a DPU in performing snapshotting an operating system (OS) tenant running on a bare-metal host device according to some embodiments;

DETAILED DESCRIPTION

Figure 1:
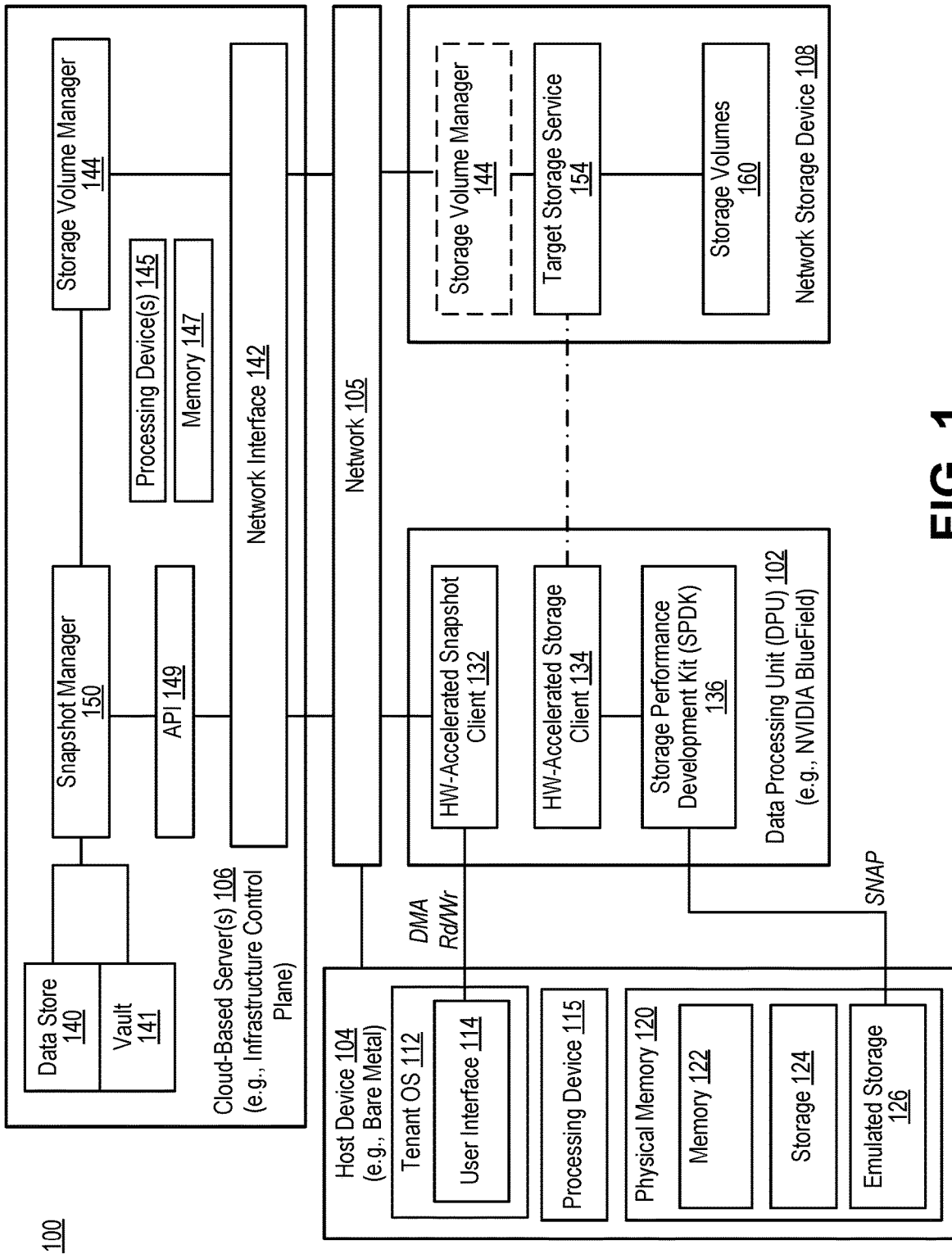
FIG. 1 is a block diagram of an example system architecture involving bare-metal machines according to various embodiments.

As described above, present methods of snapshot management in a datacenter or the like employ hypervisors or other virtualized system management components executing on computing systems hosting virtualized systems such as virtual machines and containers. The virtualized system management components such as hypervisors direct snapshotting activity and interact with one or more host-based servers implementing an infrastructure control plane. Some current datacenters offer bare-metal machines as a service, which do not employ virtualized system management components. Accordingly, known secure snapshot management performed through such virtualized system management components cannot be employed.

Aspects and embodiments of the present disclosure address the above deficiencies by employing data processing units (DPUs) that may be located at edge locations in a network of a datacenter and that are configured to support one or more bare-metal host devices (or machines) in performing snapshotting. Hereinafter "host devices" should be understood to refer to bare-metal machines or bare-metal computing devices, e.g., machines or devices operating without a hypervisor or other virtualized system management component. Because the DPU is coupled to, and not integrated with, such host devices, snapshot functionality supported by the DPU is nontrivial due to security concerns with safeguarding snapshots generated by the host device.

In some embodiments, one or more cloud-based servers manage the snapshots while the DPU interfaces with the host device to provide snapshot functionality and security between a host device and an infrastructure control plane, including support for storing snapshots in a network storage device that is remote from the host device. By using such DPU support between bare-metal host devices and the infrastructure control plane, the datacenter infrastructure is able to maintain separation from untrusted nodes composed of guests (e.g., tenant OSes or containers) executing on different host devices. In the disclosed embodiments, as will be discussed in detail, the DPUs are specially configured to facilitate, streamline, and secure snapshot-based backups of guests executing on bare metal of these host devices.

For example, in some embodiments, an integrated circuit (or DPU) includes a host interface operatively coupled to a host device executing a guest (e.g., tenant OS or container) on bare metal and one or more hardware accelerators operatively coupled to the host interface and a network interface. In some embodiments, the one or more hardware accelerators receive, over the host interface, a snapshot request relating to a snapshot of the guest such as the tenant OS. The snapshot request may include a location, in a physical memory of the host device, of a swap file having contents of random access memory of the host device. In some embodiments, the one or more hardware accelerators encrypt the swap file and initiate transfer of the encrypted swap file to a network storage device coupled to a cloud-based server. In some embodiments, the one or more hardware accelerators send, over the network interface, to a snapshot manager hosted by the cloud-based server, metadata associated with storing the encrypted swap file in the cloud-based server, to allow the snapshot manager to manage the snapshot of the tenant OS.

In various embodiments, the one or more cloud-based servers implementing the infrastructure control plane include a memory having a snapshot data store. In some embodiments, a network interface communicates with a DPU, which is coupled to a host device executing a tenant OS on bare metal. In some embodiments, the one or more cloud-based servers include one or more processing devices operatively coupled to the memory and to the network interface. In various embodiments, the one or more processing devices authenticate, based on a DPU identifier received from the DPU, a snapshot client executing on the DPU during initiation of the host device. The one or more processing devices may further store, in the snapshot data store, registration data indicating that the DPU is assigned to support the host device. The one or more processing devices may further, upon receiving, from the DPU, a request relating to a snapshot of the tenant OS executing on the host device, determine to handle the request in view of the registration data in the snapshot data store.

Therefore, advantages of the IC chips, dies, systems, and methods implemented in accordance with some embodiments of the present disclosure include, but are not limited to, facilitating secure snapshot functionality in a datacenter in which the snapshot files are stored remotely from host devices executing on bare metal. This snapshot functionality provides, for a datacenter with host devices executing on bare metal, the benefits associated with hibernation, snapshot duplication and migration, and other snapshot-related features to which users are accustomed on machines executing hypervisors. Further, features that improve usability and management of bare-metal machines help increase the value-add of DPUs and encourage bare-metal-machine adoption by cloud service providers offering Bare Metal as a Service (BMaaS), Infrastructure as a Service (IaaS), and Platform as a service (PaaS). Other advantages will be apparent to those skilled in the art of these services, DPUs, and secure, cloud-based computing, as will be discussed hereinafter.

FIG. 1 is a block diagram of an example system architecture 100 involving bare-metal machines according to various embodiments. The system architecture 100 (also referred to as "system" or "computing system" herein) includes an integrated circuit, labeled DPU 102, a host device 104, one or more cloud-based server 106 (implementing an infrastructure control plane), and a network storage device 108, which all communicate over a network 105. The system architecture 100 can be part of a data center and include one or more data stores, one or more server machines, and other components of data center infrastructure, which will be discussed. In implementations, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In various embodiments, snapshot activities are offloaded to the DPU 102 from the host device 104, which performs intermediary operations on behalf and between the host device 104 and the one or more cloud-based servers 106. In some embodiments, the host device 104 includes a tenant OS 112, and is a bare-metal machine or computing system which executes the tenant OS 112 on bare metal. The host device 104 further includes a processing device 115 and a physical memory 120, which stores instructions and data of the host device 104. In some embodiments, the physical memory 120 includes memory 122, e.g., one or more volatile devices, storage 124, e.g., one or more non-volatile memory devices, as well as emulated storage 126 that is non-volatile storage memory located on the network storage device 108.

In some embodiments, a user on the host device 104 interacts through a user interface 114 to request cloud-based services provided by the one or more cloud-based servers 106, such as services related to snapshotting. In some embodiments, the user interface 114 includes a command line interface (CLI) and is exposed to the one or more cloud-based servers 106 through the Nvidia® Graphics Processor Unit (GPU) Cloud (e.g., NGC®). In embodiments, the NGC includes a cloud-based hub for GPU-optimized software (also accessible via the DPU 102) for deep learning and high-performance computing that simplifies workflows.

In some embodiments, the user can request execution of a number of different snapshot-related operations listed in Table 1, which will be discussed in more detail later in relation to snapshot support provided to the host device 104. In various embodiments, interactions through the user interface 114 related to these snapshot operations generate different types of snapshot requests to be supported by DPU 102 and handled by the one or more cloud-based servers 106 (implementing an infrastructure control plane).

TABLE 1

| Operation | Description |
| --- | --- |
| bare-metal snapshot | Create a checkpoint of machine state (e.g., a backup "snapshot") to return back to if needed, including entering and existing hibernation. |
| bare-metal migration | Move the snapshot of machine state to a different equivalent machine in the data center. |
| bare-metal duplication | Create copies of a snapshot and have all machines start from the exact same good known state using the snapshot. |
| basic CRUD operations | Delete, list, or rename my snapshots. |
| snapshot UX | Manually snapshot as well as set the frequency of automatic snapshots. Includes UI support for snapshot management. |
| snapshot security | Snapshot to be encrypted for data confidentiality and integrity. |

As one example, in some embodiments, when requesting to enter hibernation (e.g., via a "suspend" command) or to shut down the host device 104, the host device 104 (e.g., via the user interface 114) sends a snapshot request to the DPU 102 and generates a swap file. In embodiments, a swap file includes the contents of random access memory, e.g., the memory 122 of the host device 104. This data may also include values stored in hardware registers that are dumped to the memory 122, and thus may provide an image of the state of the host device 104 (including of the processing device 115) from which to resume operation at a later time. In various embodiments, the swap file is stored in the emulated storage 126, which is physically hosted on the network storage device 108 and manageable by the one or more cloud-based servers. In embodiments, the snapshot of the host device 104 refers to the handling this swap file that may be used to resume operation of the tenant OS 112 on the host device 104. Thus, the snapshot may include metadata associated with generation and handling of the swap file, including a date and time the swap file was created, a hardware configuration of the host device 104, and an encryption key used to encrypt the swap file, which as will discussed, may be performed by the DPU 102.

In at least some embodiments, the one or more cloud-based servers 106 include a data store 140, a vault 141, a network interface 142 over which to connect to the network 105, one or more processing devices 145, and memory 147.

In some embodiments, the one or more processing devices 145 further provide an application programming interface (API) 149, and host a snapshot manager 150, and a storage manager 144, as will be explained in detail. The API 149 may be used to negotiate incoming traffic received via the network interface 142, ensuring that snapshot requests from the host 104 are properly directed to the snapshot manager 150.

In some embodiments, the data store 140 includes a snapshot database to facilitate management of snapshots from many different host devices, e.g., including using metadata received from the DPU 102 to register the host device 104 and the DPU 102. For example, registration data within this metadata may include a mapping between a host identifier of the host device 104 and a DPU identifier of the DPU 102. This mapping may be used to create and index an entry in the data store 140 associated with a snapshot generated by the host device 104.

Further, in some embodiments, the vault 141 (e.g., a HashiCorp Vault) may be a software tool adapted for secrets management, data encryption, and identity-based access. For example, the vault 141 may provide a centralized location to store, access, and distribute dynamic secrets such as API keys and encryption keys. Further, the vault 141 may generate secrets on the fly, for example, when the snapshot manager 150 interacts with the data store 140, the vault 141 may provide a short-lived unique set of database credentials for that single operation. Once the operation is completed, those credentials can be revoked. In some embodiments, the vault 141 encrypts data both in transit and at rest, making sure sensitive data remains confidential and secure. In some embodiments, the vault 141 uses an encryption key received from the DPU 102 to encrypt and decrypt data associated with snapshot requests received from the host device 104. In some embodiments, the snapshot manager 150 stores metadata related to snapshots into and retrieves from the data store 140, using the vault 141 to perform other identity and access-management functions, as well as infrastructure integration associated with snapshotting. Operations of the snapshot manager 150 will be discussed in more detail after the discussion related to FIG. 2.

In some embodiments, the network storage device 108 is a storage server (or multiple storage servers) available within the system architecture 100 containing a target storage service 154 and storage volumes 160 in which snapshots are stored corresponding to the emulated storage 126. In some embodiments, the network storage device 108 may optionally also include at least a portion or all of the storage volume manager 144 (illustrated as being a part of the one or more cloud-based servers 106).

In various embodiments, as will be discussed in more detail, the DPU 102 includes various hardware-accelerated services, to include a hardware-accelerated snapshot client 132, a hardware-accelerated storage client 134, and a storage performance development kit (SPDK) 136 executing on the DPU 102. In some embodiments, the hardware-accelerated snapshot client 132 negotiates the snapshot requests from the host device 104 (whether manual or automated) and responds to commands from the one or more cloud-based server 106 to provide the hardware and software functionality associated with a snapshot client. In some embodiments, the SPDK 136 is programmed to present the network storage device 108 (or a volume on the network storage device 108) as an emulated storage disk, which is available to the host device 104 as a Non-Volatile Memory Express (NVMe) disk over, e.g., Peripheral Component Interconnect Express (PCIe) or other bus protocol of the host interface.

In some embodiments, this emulation may also be understood as Software-defined Network Accelerated Processing (or BlueField NVMe SNAP™), technology that enables hardware-accelerated virtualization of NVMe storage. For example, NVMe SNAP™ presents networked storage as a local NVMe solid-state drive (SSD), emulating an NVMe drive on the PCIe bus, e.g., as the emulated storage 126. The tenant OS 112 can make use of its standard NVMe driver, unaware that the communication is terminated, not by a physical drive, but by the emulated storage 126. Any logic may be applied to the data via the NVMe SNAP™ framework and transmitted over the network, on either Ethernet or InfiniBand protocol, to a storage target such as the target storage service 154.

Accordingly, in some embodiments, the hardware-accelerated storage client 134 uses the SPDK 136 to manage storing the swap files in a storage volume 160 of the network storage device 108 upon hibernation, for example. When the host device 104 reboots the tenant OS 112 to resume operation, the host device 104 can retrieve the swap file from the emulated storage 126 and loads the snapshot back into the memory 120, from where operation of the tenant OS 112 may be resumed. In this way, the DPU 102 can function as an intermediary for the host device 104 (or more than one host device), the one or more cloud-based devices 106, and the network storage device 108 to facilitate secure snapshot operations for bare-metal machines/systems.

In some embodiments, the storage volumes 160 include a dedicated storage cluster that may be understood to include two types of volumes. A first volume type may be a tenant-assigned volume, which is presented to the host device 104 as the above-described emulated storage disk in which to store the swap files. A second volume type may be a dedicated snapshot volume to store checkpointed snapshots. Tenant machines may not know of the dedicated snapshot volume, which is managed by the storage volume manager 144. In various embodiments, the storage volume manager 144 is communicatively coupled to at least the snapshot manager 150, via the network interface 142, and the DPU 102. In some embodiments, the storage volume manager 144 manages to which volume(s) to store swap files in the storage volumes 160.

Figure 2:
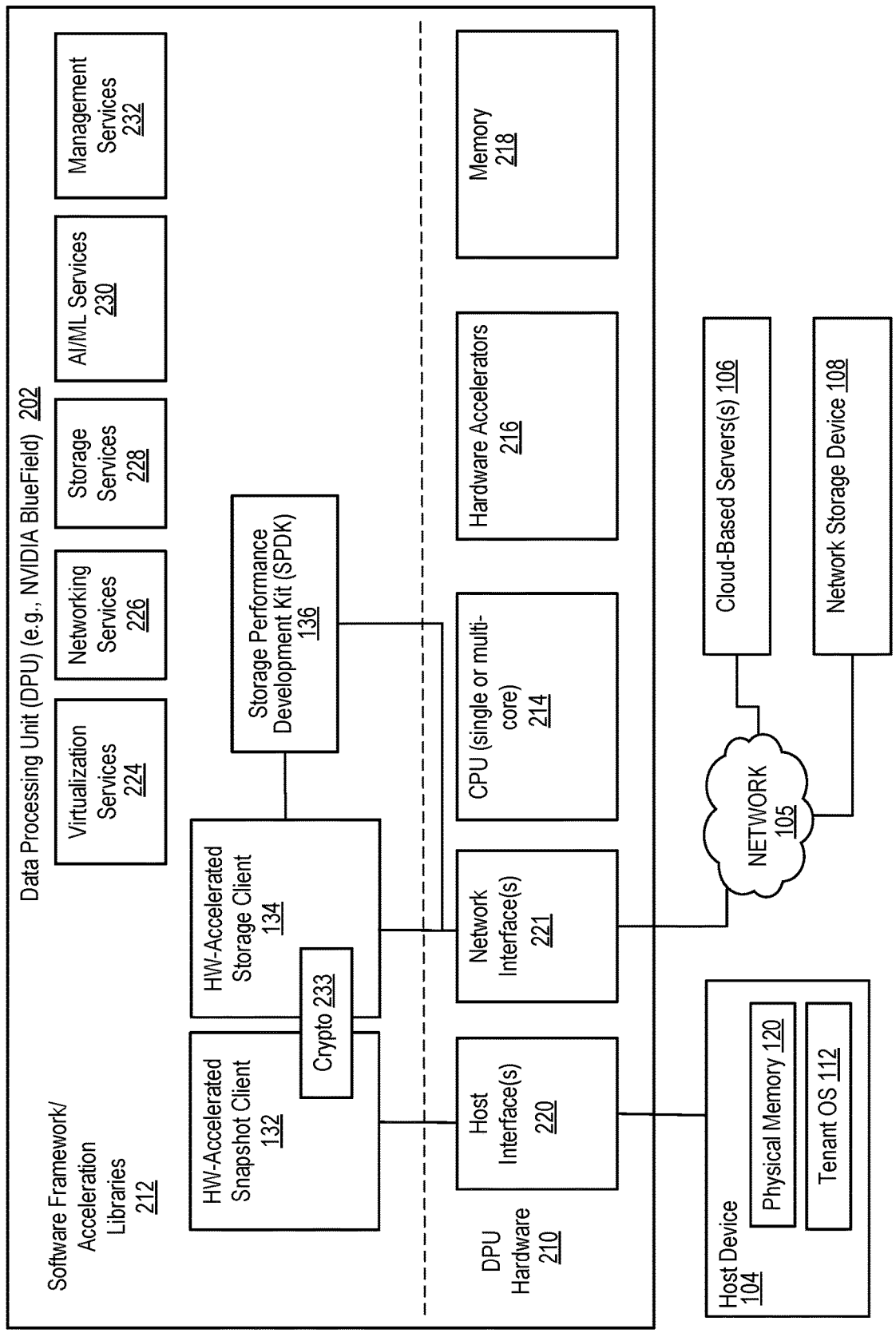
FIG. 2 is a block diagram of an example data processing unit (DPU) of the architecture of FIG. 1 according to various embodiments.

In some embodiments, the DPU 102 has access to at least a particular storage volume, within the storage volumes 160, storing the swap file for the host device 104 by way of a networked connection with the target storage service 154 (where the broken line indicates that the connection is likely networked and not direct, but can optionally be a direct connection). In some embodiments, the snapshot manager 150 interacts with the storage volume manager 144 to issue CRUD actions (related to create, read, update, delete operations) with respect to the storage volumes 160. These actions may include, by way of example only, copying Volume A into Volume B, delete Volume A, and the like. In some embodiments, the storage volume manager 144 maintains a dedicated set of volumes that are pre-allocated for snapshot management. In some embodiments, when a snapshot request comes in from the snapshot manager 150, for example, the storage volume manager 144 copies the tenant-specified machine volume of the host device 104 to the particular volume dedicated for snapshotting. FIG. 2 is a block diagram of an example data processing unit (DPU) 202 of the architecture 100 of FIG. 1 according to various embodiments. For example, the DPU 201 may be the DPU 102 of the system architecture 100. In at least one embodiment, DPU 202 is integrated as a System on a Chip (SoC) that is considered a programmable data center infrastructure on a chip. In at least one embodiment, the DPU 202 includes DPU hardware 210 and software framework with acceleration libraries 212. The DPU hardware 210 can include a central processing unit (CPU) 214 (e.g., a single-core or multi-core CPU), one or more hardware accelerators 216, memory 218, one or more host interfaces 220, and one or more network interfaces 221.

In various embodiments, the software framework and acceleration libraries 212 include one or more hardware-accelerated services, including hardware-accelerated snapshot client service 132, the hardware-accelerated storage client service 134, the SPDK 136, hardware-accelerated virtualization services 224, hardware-accelerated networking services 226, hardware-accelerated storage services 228, hardware-accelerated artificial intelligence/machine learning (AI/ML) services 230, and hardware-accelerated management services 232. In various embodiments, the hardware-accelerated snapshot client 132 and the hardware-accelerated storage client 134 each include, or are coupled to, a cryptographic ("crypto") circuit 233 employed for performing encryption and decryption of networked traffic, typically through AES XTS, although other cryptographic standards are envisioned. The crypto circuit 233 may be configured with an encryption key that is also provided to the snapshot manager 150 and may be used by the vault 141. The snapshot manager 150 can configure and manage the encryption key before the storage volume, of the storage volumes 160, is presented to the host device 104, e.g., on system boot-up or during runtime as a hot-plug.

In some embodiments, the one or more hardware accelerators 216 are operatively coupled to the host interface 220 and at least one network interface 221. In various embodiments, the one or more hardware accelerators 216 (or similar hardware accelerator engine) receive, over the host interface 220, a snapshot request relating to a snapshot of the tenant OS 112. The snapshot request can include a location, in the physical memory 120 of the host device 104, of a swap file including contents of random access memory of the host device 104. In embodiments, the one or more hardware accelerators 216 encrypt the swap file and initiate transfer of the encrypted swap file to the network storage device 108 coupled to a cloud-based server 106. In embodiments, the one or more hardware accelerators 216 send, over the network interface 221, to the snapshot manager 150 hosted by the cloud-based server 106, metadata associated with storing the encrypted swap file in the cloud-based server 106, to allow the snapshot manager 150 to manage the snapshot of the tenant OS 112. In some embodiments, the metadata includes a host identifier of the host device 104, a hardware configuration of the host device 104, a date and timestamp of the swap file, and/or an encryption key used to encrypt the swap file.

In some embodiments, the CPU 214 and the one or more hardware accelerators 216 are configured to host the hardware-accelerated snapshot client 132 that coordinates snapshot activities between the snapshot manager 150, which is hosted by the cloud-based server 106, and a snapshot user interface executed on the host device. In various embodiments, the hardware-accelerated snapshot client 132 periodically requests updates from the snapshot user interface 114 on behalf of the snapshot manager 150, e.g., any new or changed snapshot-related requests. The hardware-accelerated snapshot client 132 may further facilitate management, by the snapshot manager 150, of the host device 104 and resources available to the host device 104 associated with snapshotting. The hardware-accelerated snapshot client 132 may further facilitate management, by the snapshot manager 150, of a power state of the host device 104 in association with the snapshot request. In some embodiments, the snapshot request is associated with a hibernation request or action, and the hardware-accelerated snapshot client 132 further performs a direct memory access (DMA) read of the host device 104 to identify a configuration and state of the tenant OS 112. In embodiments, the hardware-accelerated snapshot client 132 further performs a DMA write to a particular location in the physical memory 120 that triggers a suspend-to-disk functionality, which triggers the host device 104 to generate the swap file.

In some embodiments, the CPU 214 and the one or more hardware accelerators 216 are to host a storage performance development kit (e.g., the SPDK 136) programmed to present the network storage device as an emulated storage disk, e.g., the emulated storage 126. In at least some embodiments, the CPU 214 and the one or more hardware accelerators 216 are to host the hardware-accelerated storage client 134 to employ the SPDK 136 to communicate with the network storage device 108 via PCIe protocol. In some embodiments, this communication includes to encrypt and write the encrypted swap file to the network storage device 108 (e.g., to a particular volume on the network storage device 108) and to retrieve, from the network storage device 108, the encrypted swap file in response to a request to boot the tenant OS 112. The hardware-accelerated storage client 134 may then provide an authentication token to the snapshot manager 150 that represents an identity of the integrated circuit, e.g., the DPU 202.

It should be noted that, unlike a CPU or graphics processing unit (GPU), DPU 202 is a new class of programmable processor that combines three key elements, including, for example: 1) an industry-standard, high-performance, software-programmable, CPU (single-core or multi-core CPU), tightly coupled to the other SoC components; 2) a high-performance network interface capable of parsing, processing and efficiently transferring data at line rate, or the speed of the rest of the network, to GPUs and CPUs; and 3) a rich set of flexible and programmable acceleration engines that offload and improve applications performance for AI and machine learning, security, telecommunications, and storage, among others. These capabilities can enable an isolated, bare-metal, cloud-native computing platform for cloud-scale computing. In at least one embodiment, DPU 202 can be used as a stand-along embedded processor. In at least one embodiment, DPU 202 can be incorporated into a network interface controller (also called a Smart Network Interface Card (SmartNIC)) that is used as a component in a server system. A DPU-based network interface card (network adapter) can offload processing tasks that the server system's CPU would normally handle. Using its own onboard processor, a DPU-based SmartNIC may be able to perform any combination of encryption/decryption, firewall, transport control protocol/Internet Protocol (TCP/IP), and HyperText Transport Protocol (HTTP) processing. SmartNICs can be used for high-traffic web servers, for example.

In at least one embodiment, DPU 202 can be configured for traditional enterprises' modern cloud workloads and high-performance computing. In at least one embodiment, DPU 202 can deliver a set of software-defined networking, storage, security, and management services (e.g., 222-232) at a data-center scale with the ability to offload, accelerate, and isolate data center infrastructure. In at least one embodiment, DPU 202 can provide multi-tenant, cloud-native environments with these software services. In at least one embodiment, DPU 202 can deliver data center services of up to hundreds of CPU cores, freeing up valuable CPU cycles to run business-critical applications. In at least one embodiment, DPU 202 can be considered a new type of processor that is designed to process data center infrastructure software to offload and accelerate compute load of virtualization, networking, storage, security, cloud-native AI/ML services, and other management services (e.g., 222-232).

In at least one embodiment, DPU 202 can have connectivity with packet-based interconnects (e.g., Ethernet), switched-fabric interconnects (e.g., InfiniBand, Fibre Channels, Omni-Path), or the like. In at least one embodiment, DPU 202 allows a data center to be accelerated, fully programmable, and configured with security (e.g., zero-trust security) to prevent data breaches and cyberattacks. In at least one embodiment, DPU 202 can include a network adapter, an array of processor cores, and infrastructure offload engines with full software programmability. In at least one embodiment, DPU 202 can sit at an edge of a server to provide flexible, secured, high-performance cloud and AI workloads. In at least one embodiment, DPU 202 can reduce the total cost of ownership and increase data center efficiency. In at least one embodiment, DPU 202 can provide the software framework 212 (e.g., NVIDIA DOCA™) that enables developers to rapidly create applications and services for DPU 202, such as security services 222, virtualization services 224, networking services 226, storage services 228, AI/ML services 230, and management services 232. In at least one embodiment, the software framework 212 makes it easy to leverage hardware accelerators of DPU 202 to provide data center performance, efficiency, and security.

In at least one embodiment, DPU 202 can provide networking services 226 with a virtual switch (vSwitch), a virtual router (vRouter), network address translation (NAT), load balancing, and network virtualization (NFV). In at least one embodiment, DPU 202 can provide storage services 228, including NVME™ over fabrics (NVMe-oF™) technology, elastic storage virtualization, hyper-converged infrastructure (HCI) encryption, data integrity, compression, data deduplication, or the like. NVM Express™ is an open logical device interface specification for accessing non-volatile storage media attached via the PCI Express® (PCIe) interface. NVMe-OF™ provides an efficient mapping of NVMe commands to several network transport protocols, enabling one computer (an "initiator") to access block-level storage devices attached to another computer (a "target") very efficiently and with minimum latency. The term "Fabric" is a generalization of the more specific ideas of network and input/output (I/O) channel. It essentially refers to an N:M interconnection of elements, often in a peripheral context. The NVMe-oF™ technology enables the transport of the NVMe command set over a variety of interconnection infrastructures, including networks (e.g., Internet Protocol (IP)/Ethernet) and also I/O Channels (e.g., Fibre Channel). In at least one embodiment, DPU 202 can provide security services 222 using Next-Generation Firewall (FGFW), Intrusion Detection Systems (IDS), Intrusion Prevention System (IPS), a root of trust, micro-segmentation, distributed denial-of-service (DDoS) prevention technologies, and ML detection using data extraction logic 246 (e.g., of AppShield). NGFW is a network security device that provides capabilities beyond a stateful firewall, like application awareness and control, integrated intrusion prevention, and cloud-delivered threat intelligence. In at least one embodiment, the one or more network interfaces 221 can include an Ethernet interface (single or dual ports) and an InfiniBand interface (single or dual ports). In at least one embodiment, the one or more host interfaces 220 can include a PCIe interface and a PCIe switch. In at least one embodiment, the one or more host interfaces 220 can include other memory interfaces. In at least one embodiment, CPU 214 can include multiple cores (e.g., up to 8 64-bit core pipelines) with L2 cache per two one or two cores and L3 cache with eviction policies support for double data rate (DDR) dual in-line memory module (DIMM) (e.g., DDR4 DIMM support), and a DDR4 DRAM controller. Memory 218 can be on-board DDR4 memory with error correction code (ECC) error protection support. In at least one embodiment, CPU 214 can include a single core with L2 and L3 caches and a DRAM controller. In at least one embodiment, the one or more hardware accelerators 216 can include a security accelerator, a storage accelerator, and a networking accelerator.

In at least one embodiment, the network accelerator can provide remote direct memory access (RDMA) over Converged Ethernet (ROCE) ROCE, Zero Touch ROCE, Stateless offloads for TCP, IP, and User Datagram Protocol (UDP), Large Receive Offload (LRO), Large Segment Offload (LSO), checksum, Total Sum of Squares (TSS), Residual Sum of Squares (RSS), HTTP dynamic streaming (HDS), and virtual local area network (VLAN) insertion/stripping, single root I/O virtualization (SR-IOV), virtual Ethernet card (e.g., VirtIO-net), Multi-function per port, VMware NetQueue support, Virtualization hierarchies, and ingress and egress Quality of Service (QOS) levels (e.g., 1K ingress and egress QoS levels). In at least one embodiment, DPU 102 can also provide boot options including secure boot (RSA authenticated), remote boot over Ethernet, remote boot over Internet Small Computer System Interface (iSCSI), Preboot execution environment (PXE), and Unified Extensible Firmware Interface (UEFI).

In at least one embodiment, DPU 202 provides management services including 1 GbE out-of-band management port, network controller sideband interface (NC-SI), Management Component Transport Protocol (MCTP) over System Management Bus (SMBus), and Monitoring Control Table (MCT) over PCIe, Platform Level Data Model (PLDM) for Monitor and Control, PLDM for Firmware Updates, Inter-Integrated Circuit (I2C) interface for device control and configuration, Serial Peripheral Interface (SPI) interface to flash, embedded multi-media card (eMMC) memory controller, Universal Asynchronous Receiver/Transmitter (UART), and Universal Serial Bus (USB).

FIG. 3 is a flow chart of an example method 300 for a DPU's facilitation of snapshotting an operating system (OS) tenant running on a bare-metal host device according to some embodiments. In at least one embodiment, the method 300 is performed by processing logic of the DPU 102 or 202. The processing logic can be a combination of hardware, firmware, software, or any combination thereof. The method 300 may be performed by one or more data processing units (e.g., DPUs, CPUs, and/or GPUs), which may include (or communicate with) one or more memory devices. In at least one embodiment, the method 300 is performed by multiple processing threads, each thread executing one or more individual functions, routines, subroutines, or operations of the method. In at least one embodiment, processing threads implementing method 300 may be synchronized (e.g., using semaphores, critical sections, and/or other thread synchronization logics). Alternatively, processing threads implementing method 300 may be executed asynchronously with respect to each other. Various operations of method 300 may be performed in a different order compared with the order shown in FIG. 3. Some operations of the methods may be performed concurrently with other operations. In at least one embodiment, one or more operations shown in FIG. 3 may not always be performed.

At operation 310, the processing logic receives a snapshot request relating to a snapshot of a tenant operating system (OS) executing on bare metal of the host device 104 coupled to the DPU 102 or 202. The snapshot request may include a location, in the physical memory 120 of the host device 104, of a swap file including contents of random access memory of the physical memory 120.

At operation 320, the processing logic encrypts the swap file.

At operation 330, the processing logic transfers the encrypted swap file to the network storage device 108 coupled to the DPU 102 or 202 and the cloud-based server 106.

At operation 340, the processing logic sends, to the snapshot manager 150 hosted by the cloud-based server 106, metadata associated with storing the swap file in the cloud-based server 106, to allow the snapshot manager to manage the snapshot of the tenant OS. Additional features and operations related to the DPUs 102 and 202 will be discussed with reference to FIGS. 5A-5B and FIG. 6.

FIG. 4 is a flow chart of an example method 400 for a cloud-based server to interact with a DPU in performing snapshotting an operating system (OS) tenant running on a bare-metal host device according to some embodiments. In at least one embodiment, the method 400 is performed by processing logic of the one or more cloud-based servers 106, e.g., that implement a infrastructure control plane. The one or more cloud-based servers 106 may include a memory 147 including a snapshot data store, a network interface 142 to communicate with the DPU 102 or 202, which is coupled to a host device 104 executing a tenant OS on bare metal. The one or more cloud-based servers 106 may further include one or more processing devices operatively coupled to the memory and to the network interface.

The processing logic can be a combination of hardware, firmware, software, or any combination thereof. The method 400 may be performed by one or more data processing units (e.g., DPUs, CPUs, and/or GPUs), which may include (or communicate with) one or more memory devices. In at least one embodiment, the method 400 is performed by multiple processing threads, each thread executing one or more individual functions, routines, subroutines, or operations of the method. In at least one embodiment, processing threads implementing method 400 may be synchronized (e.g., using semaphores, critical sections, and/or other thread synchronization logics). Alternatively, processing threads implementing method 400 may be executed asynchronously with respect to each other. Various operations of method 400 may be performed in a different order compared with the order shown in FIG. 4. Some operations of the methods may be performed concurrently with other operations. In at least one embodiment, one or more operations shown in FIG. 4 may not always be performed.

At operation 410, the processing logic authenticates, based on a DPU identifier received from the DPU 102 or 202, a snapshot client executing on the DPU during initiation of the host device 104.

At operation 420, the processing logic stores, in the snapshot data store, registration data indicating that the DPU is assigned to support the host device 104. In some embodiments, registration data includes a mapping between a host identifier of the host device 104 and the DPU identifier, wherein the host identifier is retrieved from the request.

At operation 430, the processing logic, upon receiving, from the DPU 101 or 202, a request relating to a snapshot of the tenant OS 112 executing on the host device, determine to handle the request in view of the registration data in the snapshot data store. Additional features and operations related to the one or more cloud-based servers 106 will be discussed with reference to FIGS. 5A-5B and FIG. 6.

Figure 5A:
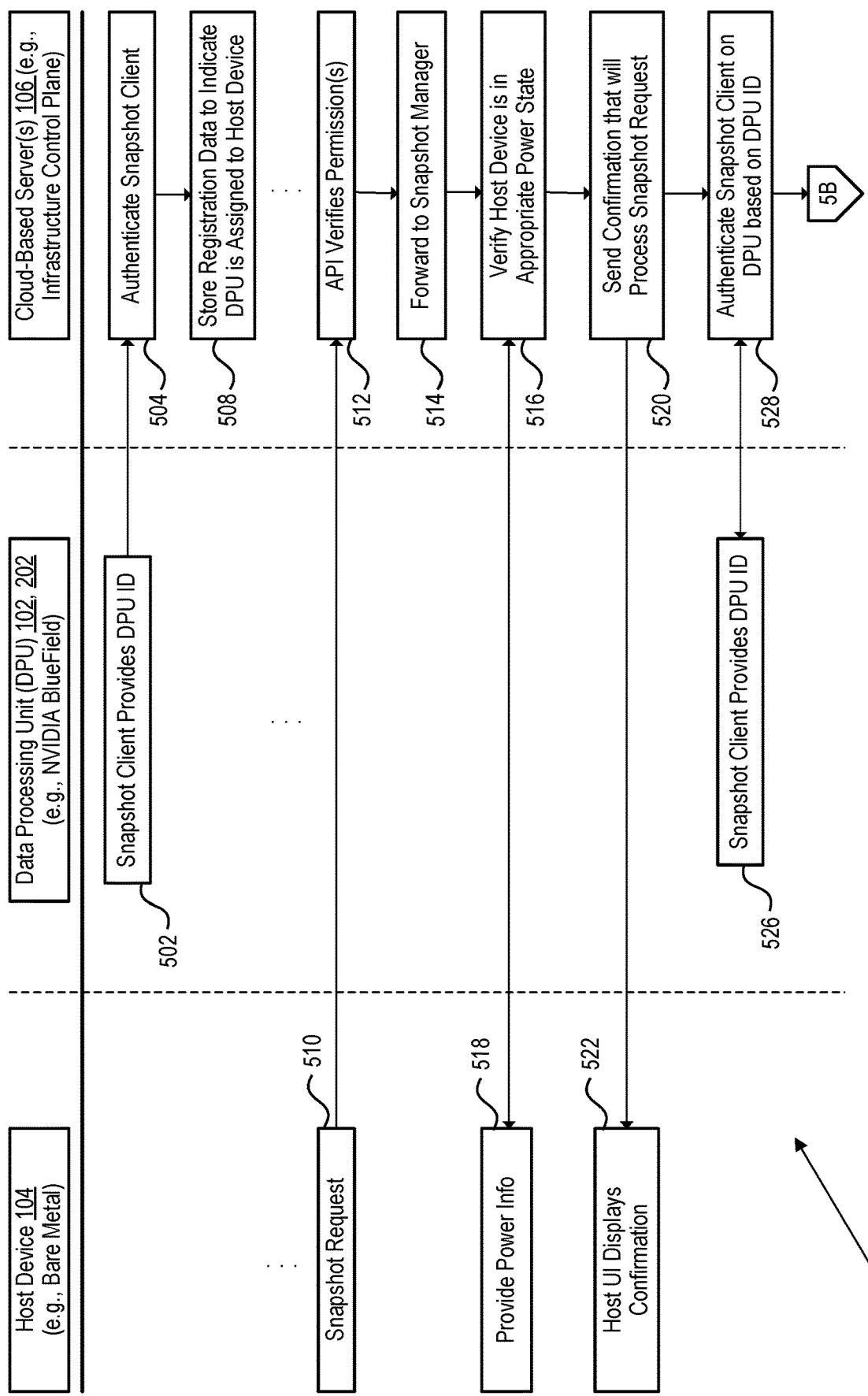
FIGS. 5A-5B are a flow diagrams of an example method for processing a snapshot request from a bare-metal host device through a DPU coupled to a cloud-based server according to some embodiments.
Figure 5B:
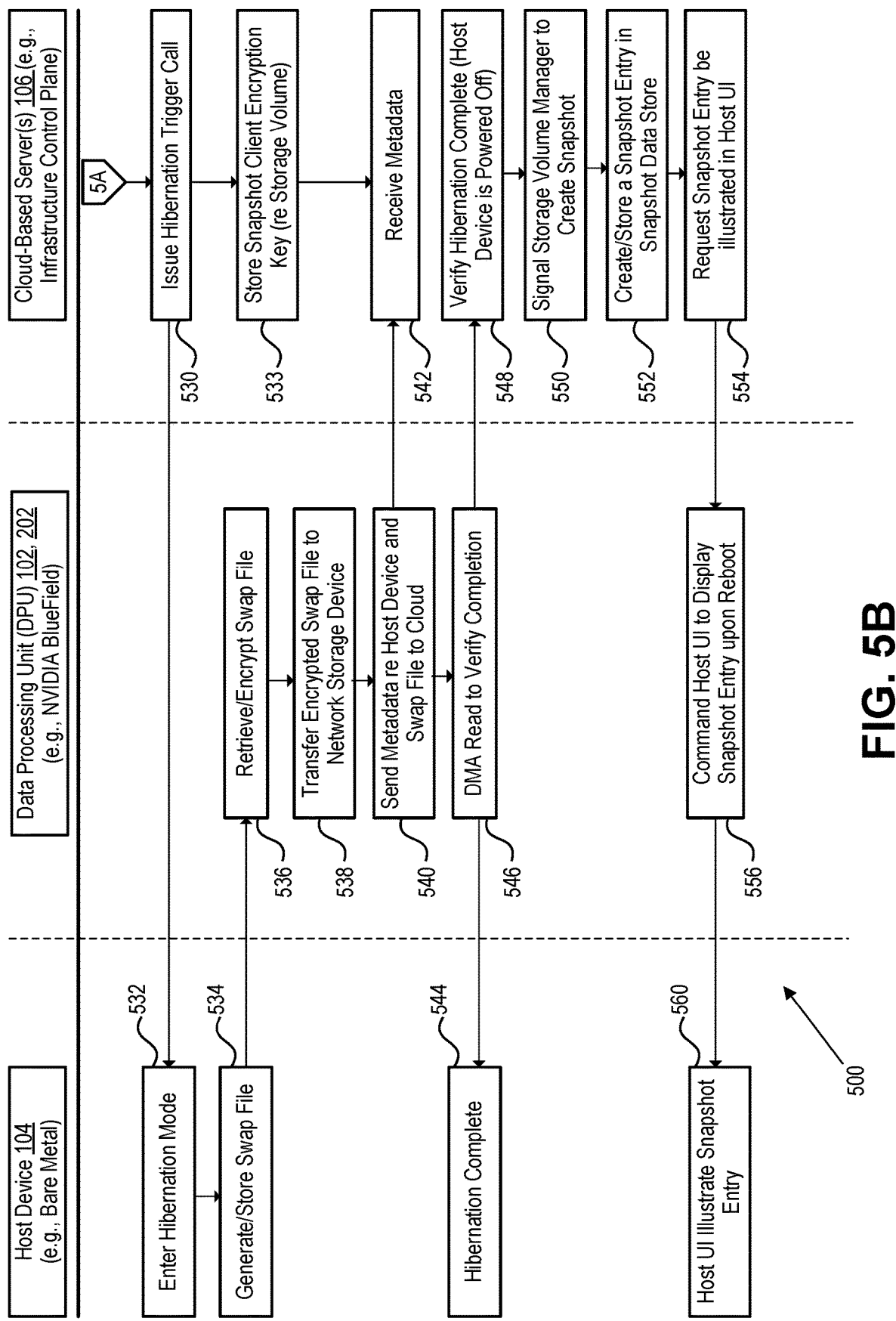

FIGS. 5A-5B are a flow diagrams of an example method 500 for processing a snapshot request from a bare-metal host device through a DPU coupled to a cloud-based server according to some embodiments. In at least one embodiment, the method 500 is performed by processing logic of the system architecture 100, including the host device 104 executing on a bare-metal machine, the DPU 202 (which can also be DPU 102, as mentioned), and the one or more cloud-based servers 106. The processing logic can be a combination of hardware, firmware, software, or any combination thereof. Although not specifically illustrated each time, any operations involving communication between the host device 104 and the one or more cloud-based servers 106, communicate through the DPU 202, e.g., the hardware-accelerated snapshot client 132.

The method 500 may be performed by one or more data processing units (e.g., DPUs, CPUs, and/or GPUs), which may include (or communicate with) one or more memory devices. In at least one embodiment, the method 500 is performed by multiple processing threads, each thread executing one or more individual functions, routines, subroutines, or operations of the method. In at least one embodiment, processing threads implementing method 500 may be synchronized (e.g., using semaphores, critical sections, and/or other thread synchronization logics). Alternatively, processing threads implementing method 500 may be executed asynchronously with respect to each other. Various operations of method 500 may be performed in a different order compared with the order shown in FIG. 5. Some operations of the methods may be performed concurrently with other operations. In at least one embodiment, one or more operations shown in FIG. 5 may not always be performed.

With specific reference to FIG. 5A, at operation 502, the hardware-accelerated snapshot client 132 on the DPU 202 provides a DPU identifier to the one or more cloud based servers 106, e.g., initially when getting registered with the infrastructure control plane.

At operation 504, the one or more cloud-based servers 106 (e.g., the snapshot manager 150) authenticate the snapshot client 132 and, at operation 508, store the registration data in the data store 140 to indicate the DPU is assigned to support the host device 104. This registration data may be accessed later to authenticate further snapshot requests from DPU 202 on behalf of the host device 104.

At some time during later operation of the host device, at operation 510, the host device 104 sends a snapshot request to the one or more cloud-based servers 106. This snapshot request may be one of the operations requestable via the user interface 114 and listed in Table 1.

At operation 512, the API 149 verifies the host device 104 has the correct permissions to perform the snapshot request.

At operation 514, assuming the permissions are verified at operation 512, the API forwards the snapshot request to the snapshot manager 150.

At operation 516, the snapshot manager 150 verifies a power state of the host device 104 appropriate for snapshotting. At operation 522, the host device 104 provides power information as the power state.

At operation 520, once the host device 104 is in an appropriate power state, the snapshot manager 150 sends a confirmation message that the snapshot request is being processed. At operation 522, the user interface 114 on the host device 104 displays the confirmation, e.g., so that the user is updated.

At operation 526, the DPU 202 (e.g., the snapshot client 132) provides the DPU identifier to the snapshot manager 150, e.g., in response to a request from the snapshot manager 150. At operation 528, the snapshot manager 150 authenticates, using the DPU identifier, the snapshot client 132 executing on the DPU 202.

With specific reference to FIG. 5B, the snapshot manager 150 issues a hibernation trigger call, via the DPU 202, to the host device 104. In response, at operation 532, the host device enters hibernation mode. At operation 534, the hibernation mode triggers generation of the swap file, which is stored in a particular location of the physical memory 120. While operations 532 and 534 take place, at operation 533, the snapshot manager 150 proceeds with storing the encryption key that has been generated and configured on the DPU 202. The encryption key may be generated by the vault 141 and stored in the data store 140, for example.

At operation 536, the DPU 202 retrieves the swap file and encrypts the swap file, e.g., using the encryption key with which the snapshot manager 150 has configured the DPU 202.

At operation 538, the DPU 202 transfers the encrypted swap file to the network storage device 108 to be stored in a particular volume of the storage volume 160.

At operation 540, the DPU sends metadata associated with the host device 104 and with the swap file to the one or more cloud-based servers 106. In some embodiments, the metadata includes a host identifier of the host device 104, a hardware configuration of the host device 104, a date and timestamp of the swap file, and the encryption key used to encrypt the swap file.

At operation 542, the snapshot manager 150 receives the metadata, which can be used in later creating and storing a snapshot in the data store.

At operation 544, the host device 104 completes hibernation, which stores an indicator in the memory 122 of the host device 104.

At operation 546, the DPU 202 performs a direct memory access (DMA) read of the memory 122 of the host device 104 to determine that the host device completed hibernation.

At operation 548, the snapshot manager 150 verifies the hibernation is complete based on indication received from the DPU 202. This verification includes that the host device 104 is powered off (or at least sleeping).

At operation 550, the snapshot manager 150 signals the storage volume manager 144 to create a snapshot associated with the swap file.

At operation 552, the snapshot manager 150 creates and stores a snapshot entry in the data store 140 associated with the host device 104. In some embodiments, the entry includes at least the date and time (e.g., when the swap file was created) and a storage volume location in the network storage device 108.

At operation 554, the snapshot manager 150 requests the snapshot entry be illustrated in the user interface 114 of the host device 104. At operation 556, the DPU 202 commands the user interface 114 to display the snapshot entry upon reboot, e.g., when the tenant OS 112 associated with the snapshot (and swap file) is rebooted and operational. At operation 560, the user interface 114 illustrates the snapshot entry upon the tenant OS 112 becoming operational. In this way, the snapshot manager 150 is able to populate an indication of the snapshot entry within a snapshot user interface executing on the host device 104.

Figure 6:
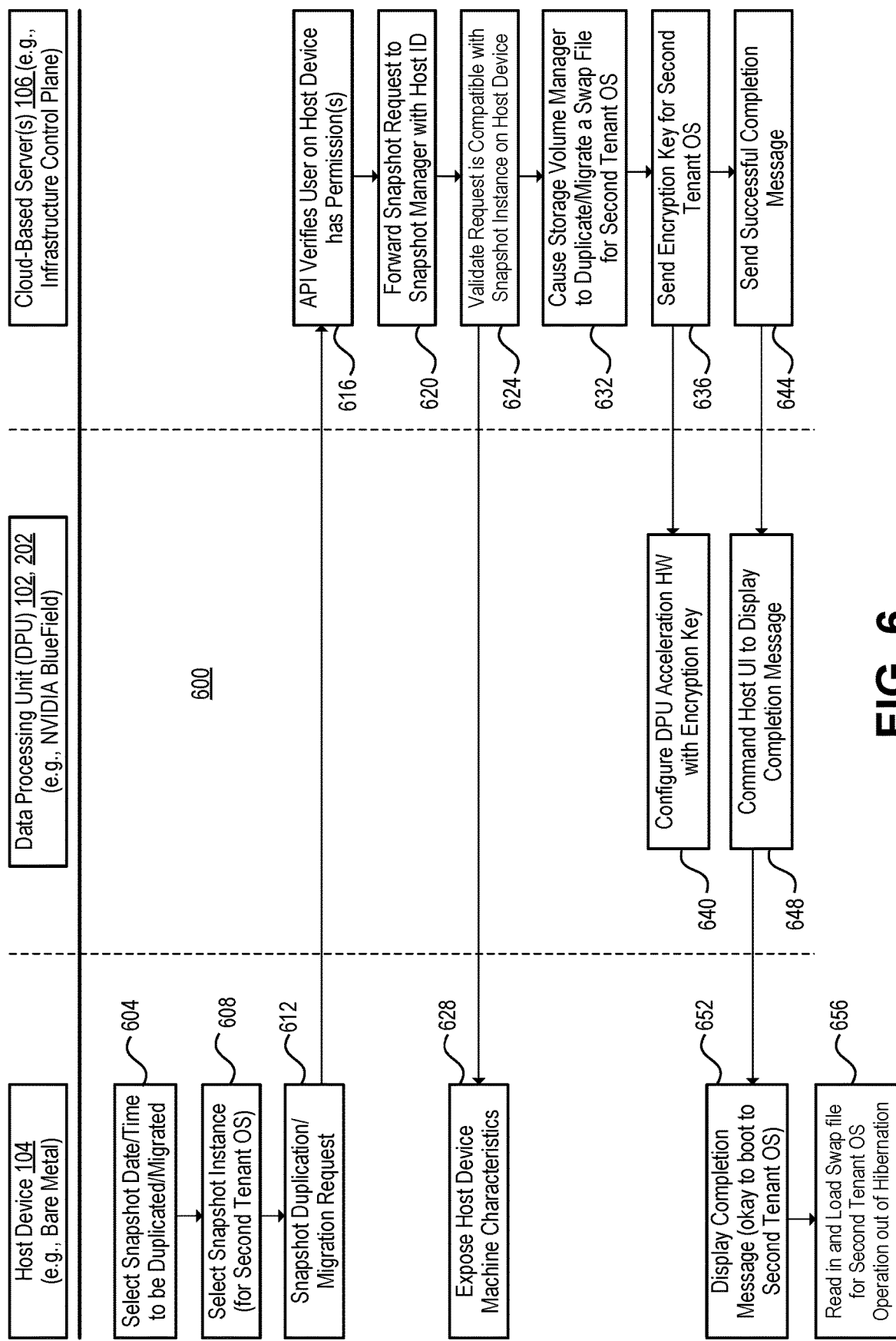
FIG. 6 is a flow diagram of an example method for processing a duplication or migration snapshot request from a bare-metal host device through a DPU coupled to a cloud-based server according to some embodiments.

FIG. 6 is a flow chart of an example method 600 for processing a duplication or migration snapshot request from a bare-metal host device through a DPU coupled to a cloud-based server according to some embodiments. In at least one embodiment, the method 600 is performed by processing logic of the system architecture 100, including the host device 104 executing on a bare-metal machine, the DPU 202 (which can also be DPU 102, as mentioned), and the one or more cloud-based servers 106. The processing logic can be a combination of hardware, firmware, software, or any combination thereof. Although not specifically illustrated each time, any operations involving communication between the host device 104 and the one or more cloud-based servers 106, communicate through the DPU 202, e.g., the hardware-accelerated snapshot client 132.

The method 600 may be performed by one or more data processing units (e.g., DPUs, CPUs, and/or GPUs), which may include (or communicate with) one or more memory devices. In at least one embodiment, the method 600 is performed by multiple processing threads, each thread executing one or more individual functions, routines, subroutines, or operations of the method. In at least one embodiment, processing threads implementing method 600 may be synchronized (e.g., using semaphores, critical sections, and/or other thread synchronization logics). Alternatively, processing threads implementing method 600 may be executed asynchronously with respect to each other. Various operations of method 600 may be performed in a different order compared with the order shown in FIG. 6. Some operations of the methods may be performed concurrently with other operations. In at least one embodiment, one or more operations shown in FIG. 6 may not always be performed.

At operation 604, the host device 104 receives a selection (e.g., through the user interface 114) of a date and time of a snapshot to be duplicated or migrated.

At operation 608, the host device 104 receives a snapshot instance selection, e.g., for a second tenant OS that is the duplicated or migrated snapshot.

At operation 612, the host device sends a snapshot request that is a snapshot duplication request or snapshot migration request identifying the date and time and the second tenant OS.

At operation 616, the API 149 verifies the user on the host device 612 has permission to request such duplication or migration.

At operation 620, the API 149 forwards the snapshot request to the snapshot manager 150 with the host identifier.

At operation 624, the snapshot manager 150 validates the snapshot request is compatible with a second tenant OS associated with the snapshot duplication request or the snapshot migration request. At operation 628, the host device 104 exposes its machine characteristics with which the snapshot manager 150 can perform the validation specified in operation 624.

At operation 632, the snapshot manager 150 causes the storage volume manager 144 to copy or move, respectively, a swap file including the host identifier associated with the second tenant OS, to be stored in a particular storage volume 160 of the network storage device 108 assigned to the host device 104.

At operation 636, the snapshot manager sends the encryption key for the second tenant OS to the DPU 202. At operation 640, the hardware-accelerated snapshot client 132 configures the DPU 202 with the encryption key (e.g., the new encryption key) for use with the second tenant OS.

At operation 644, the snapshot manager 150 sends a successful completion message to the DPU 202 in relation to the snapshot duplication request or the snapshot migration request.

At operation 648, the DPU 202 sends a command to the user interface 114 to display a completion message from the snapshot manager 150.

At operation 652, the host device 104 displays the completion message in the user interface 114, e.g., such as that the host device 104 can now boot to the second tenant OS.

At operation 656, the host device reads in and loads the swap file for the second tenant OS so that the second tenant OS can begin operation out of hibernation. At operation 656, for example, the DPU 202 can utilize NVMe SNAP™ to present the volume in the network storage device 108 that represents the duplicated or migrated snapshot obtained from the snapshot database in the data store 140. The host device 104 can then load up from the hibernation snapshot of the second tenant OS and start execution from that stored state.

Figure 7:
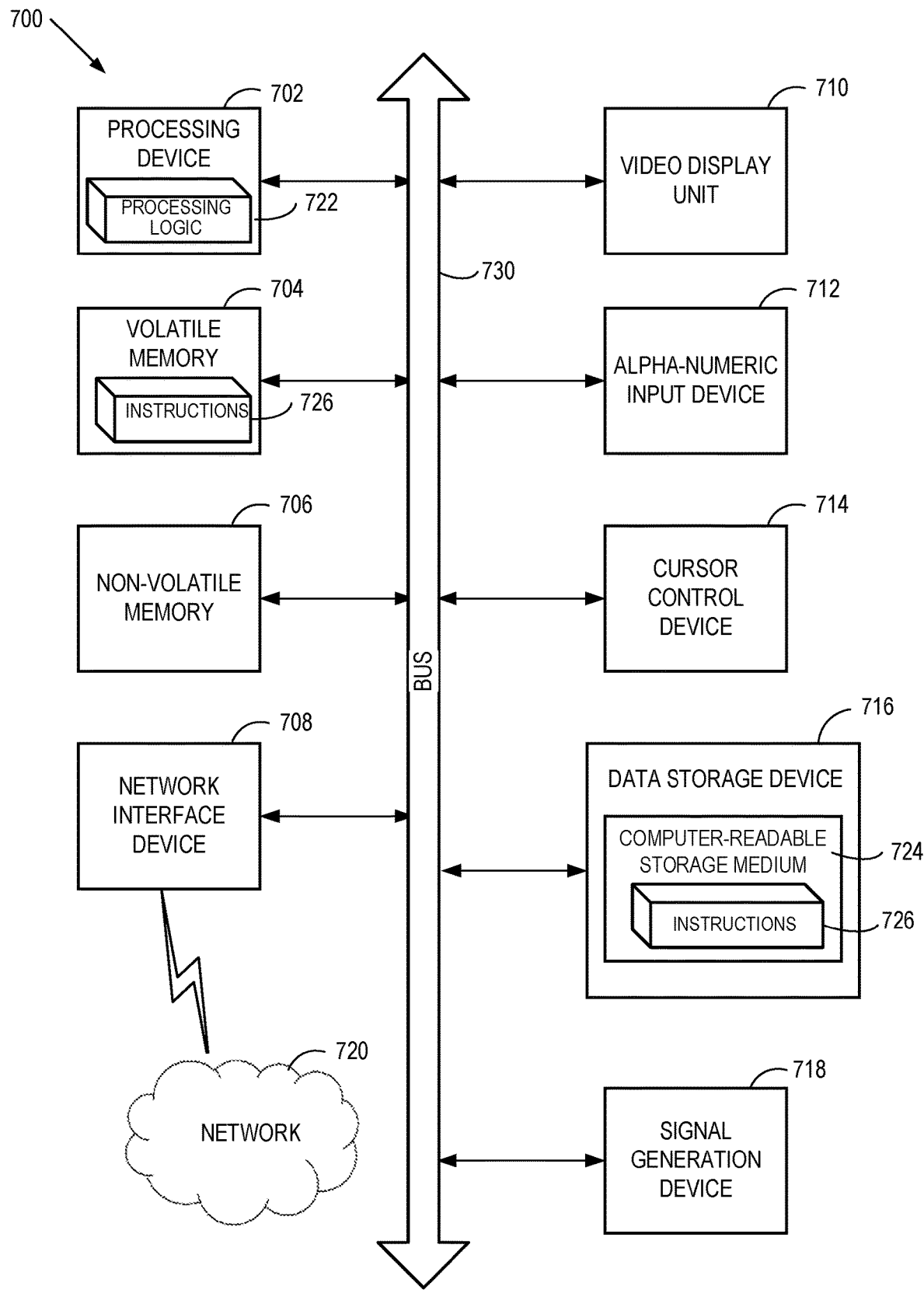
FIG. 7 illustrates a block diagram illustrating an exemplary computer device, in accordance with implementations of the present disclosure.

FIG. 7 illustrates a block diagram illustrating an exemplary computer device 700, in accordance with implementations of the present disclosure. Computer device 700 can correspond to one or more components of cloud-based server(s) 106, the host device 104, and/or the network storage device 108, as described above. The computer device 700 also, when explained as a distributed system, can be understood to include the DPU 102 or 202 in some embodiments. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor, CPU, or GPU), a volatile memory 704 (or main memory, e.g., read-only memory (ROM), flash memory, dynamic random access memory (DRAM) such as synchronous DRAM (SDRAM), etc.), a non-volatile memory 706 (e.g., flash memory, static random access memory (SRAM), etc.), and a secondary memory (e.g., a data storage device 716), which can communicate with each other via a bus 730.

Processing device 702 (which can include processing logic 722) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an ASIC, a FPGA, a digital signal processor (DSP), network processor, or the like. In accordance with one or more aspects of the present disclosure, processing device 702 can be configured to execute instructions performing method 300 for implementing out of band threat prevention.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 718 (e.g., a speaker).

Data storage device 716 can include a computer-readable storage medium (or, more specifically, a non-transitory computer-readable storage medium) 724 on which is stored one or more sets of executable instructions 726. In accordance with one or more aspects of the present disclosure, executable instructions 726 can comprise executable instructions performing method 300 for implementing out of band threat prevention.

Executable instructions 726 can also reside, completely or at least partially, within volatile memory 704 and/or within processing device 702 during execution thereof by example computer device 700, volatile memory 404 and processing device 702 also constituting computer-readable storage media. Executable instructions 726 can further be transmitted or received over a network via network interface device 708.

While the computer-readable storage medium 724 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. An integrated circuit comprising:
    a host interface operatively coupled to a host device executing a tenant operating system (OS) on bare metal; and
    one or more hardware accelerators, operatively coupled to the host interface and a network interface, wherein the one or more hardware accelerators are to:
        receive, over the host interface, a snapshot request relating to a snapshot of the tenant OS, the snapshot request comprising a location, in a physical memory of the host device, of a swap file comprising contents of random access memory of the host device;
        encrypt the swap file and initiate transfer of the encrypted swap file to a network storage device coupled to a cloud-based server; and
        send, over the network interface, to a snapshot manager hosted by the cloud-based server, metadata associated with storing the encrypted swap file in the cloud-based server, to allow the snapshot manager to manage the snapshot of the tenant OS.

2. The integrated circuit of claim 1, further comprising a central processing unit (CPU) operatively coupled to the host interface and the network interface, wherein the CPU and the one or more hardware accelerators are to host a hardware-accelerated snapshot client that coordinates snapshot activities between the snapshot manager and a snapshot user interface executed on the host device, wherein the snapshot manager is hosted by the cloud-based server.

3. The integrated circuit of claim 2, wherein the hardware-accelerated snapshot client is further to perform at least one of:
  periodically request updates from the snapshot user interface on behalf of the snapshot manager;
  facilitate management, by the snapshot manager, of resources available to the host device associated with snapshotting; or
  facilitate management, by the snapshot manager, of a power state of the host device in association with the snapshot request.

4. The integrated circuit of claim 2, wherein the snapshot request is associated with a hibernation request, and wherein the hardware-accelerated snapshot client is further to:
  perform a direct memory access (DMA) read of the host device to identify a configuration and state of the tenant OS; and
  perform a DMA write to a particular location in the physical memory that triggers a suspend-to-disk functionality, wherein the suspend-to-disk functionality triggers the host device to generate the swap file.

5. The integrated circuit of claim 1, wherein the integrated circuit is a data processing unit (DPU), wherein the DPU is a programmable data center infrastructure on a chip.

6. The integrated circuit of claim 1, wherein the metadata comprises one or more of a host identifier of the host device, a hardware configuration of the host device, a date and timestamp of the swap file, and an encryption key used to encrypt the swap file.

7. The integrated circuit of claim 1, further comprising a central processing unit (CPU) operatively coupled to the host interface and the network interface, wherein the CPU and the one or more hardware accelerators are to host a storage performance development kit (SPDK) programmed to present the network storage device as an emulated storage disk, which is available to the host device as a Non-Volatile Memory Express (NVMe) disk over Peripheral Component Interconnect Express (PCIe) of the host interface.

8. The integrated circuit of claim 7, wherein the CPU and the one or more hardware accelerators are further to host a hardware-accelerated storage client to:
  employ the SPDK to communicate with the network storage device via PCIe protocol, including to encrypt and write the encrypted swap file to the network storage device and to retrieve, from the network storage device, the encrypted swap file in response to a request to boot the tenant OS; and
  provide an authentication token to the snapshot manager that represents an identity of the integrated circuit.

9. A computing system comprising:
  a memory comprising a snapshot data store;
  a network interface to communicate with a data processing unit (DPU), wherein the DPU is coupled to a host device executing a tenant operating system (OS) on bare metal; and
  one or more processing devices operatively coupled to the memory and to the network interface, the one or more processing devices to:
    authenticate, based on a DPU identifier received from the DPU, a snapshot client executing on the DPU during initiation of the host device;
    store, in the snapshot data store, registration data indicating that the DPU is assigned to support the host device; and
    upon receiving, from the DPU, a request relating to a snapshot of the tenant OS executing on the host device, determine to handle the request in view of the registration data in the snapshot data store.

10. The computing system of claim 9, wherein the registration data comprises a mapping between a host identifier of the host device and the DPU identifier, wherein the host identifier is obtained from the request.

11. The computing system of claim 9, wherein the request comprises a snapshot request, wherein the one or more processing devices are further to, in response to the request:
  verify a power state of the host device appropriate for snapshotting;
  issue a hibernation trigger call, via the DPU, to the host device;
  store, in the snapshot data store associated with the DPU and the host device, an encryption key generated by a storage client executing on the DPU; and
  receive, from the DPU, an indication of completion of hibernation of the host device.

12. The computing system of claim 9, wherein the network interface is further to communicate with a network storage device that is also coupled to the DPU, wherein the request is a snapshot request, and wherein the one or more processing devices are further to:
  cause a storage volume manager to store a swap file, received from the host device by the DPU, in a particular storage volume of the network storage device;
  identify a date and time of generating the swap file; and
  store an entry in the snapshot data store associated with the host device, wherein the entry includes at least the date and time and a storage volume location in the network storage device.

13. The computing system of claim 12, wherein the one or more processing devices are further to, via the DPU, populate an indication of the entry within a snapshot user interface executing on host device.

14. The computing system of claim 9, wherein the network interface is further to communicate with a network storage device that is also coupled to the DPU, wherein the tenant OS is a first tenant OS, wherein the request comprises one of a snapshot duplication request or a snapshot migration request, and wherein the one or more processing devices are further to, in response to the request:
  access an entry in the snapshot data store for the host device to verify that the host device has permission to request one of a snapshot duplication or a snapshot migration;
  validate that the host device is compatible with a second tenant OS associated with the one of the snapshot duplication request or the snapshot migration request; and
  cause a storage volume manager to copy or move a swap file comprising a host identifier associated with the second tenant OS, to be stored in a particular storage volume of the network storage device assigned to the host device.

15. The computing system of claim 14, wherein the one or more processing devices are further to:
  configure the DPU with an encryption key for the second tenant OS; and
  send a successful completion message to a snapshot user interface on the host device, the successful completion message indicating that the second tenant OS can now be booted.

16. A method comprising:
  receiving, by a data processing unit (DPU), a snapshot request relating to a snapshot of a tenant operating system (OS) executing on bare metal of a host device coupled to the DPU, the snapshot request comprising a location, in a physical memory of the host device, of a swap file comprising contents of random access memory of the physical memory;

encrypting the swap file;

transferring, by the DPU, the encrypted swap file to a network storage device coupled to the DPU and a cloud-based server; and sending, by the DPU, to a snapshot manager hosted by the cloud-based server, metadata associated with storing the encrypted swap file in the cloud-based server, to allow the snapshot manager to manage the snapshot of the tenant OS.

17. The method of claim 16, wherein the metadata comprises one or more of a host identifier of the host device, a hardware configuration of the host device, a timestamp of the swap file, and an encryption key used to encrypt the swap file.

18. The method of claim 16, wherein the snapshot request is associated with a hibernation request, the method further comprising:

performing a direct memory access (DMA) read of the host device to identify a configuration and state of the tenant OS; and performing a DMA write to a particular location in the physical memory that triggers a suspend-to-disk functionality, wherein the suspend-to-disk functionality triggers the host device to generate the swap file.

19. The method of claim 16, further comprising hosting, by the DPU, a storage performance development kit (SPDK) programmed to present the network storage device as an emulated storage disk, which is available to the host device as a Non-Volatile Memory Express (NVMe) disk over Peripheral Component Interconnect Express (PCIe) of a host interface of the host device.

20. The method of claim 19, further comprising:

employing, by the DPU, the SPDK to communicate with the network storage device via PCIe protocol, including encrypting and writing the encrypted swap file to the network storage device and retrieving, from the network storage device, the encrypted swap file in response to a request to boot the tenant OS; and providing, by the DPU, an authentication token to the snapshot manager that represents an identity of the DPU.

21. The method of claim 16, further comprising at least one of:

periodically requesting updates from a snapshot user interface of the host device on behalf of the snapshot manager;

facilitating management, by the snapshot manager, of the host device and resources available to the host device associated with snapshotting; or facilitating management, by the snapshot manager, of a power state of the host device in association with the snapshot request.

* * * * *